United States Patent [19]
White, Jr. et al.

[11] 3,977,702
[45] Aug. 31, 1976

[54] PIPE COUPLING WITH RETRIEVABLE SETTING MEANS

[75] Inventors: William E. White, Jr.; James F. Arnold, both of Houston, Tex.

[73] Assignee: HydroTech International, Inc., Houston, Tex.

[22] Filed: Mar. 13, 1975

[21] Appl. No.: 557,969

[52] U.S. Cl. .............................. 285/18; 285/145; 285/337; 285/348
[51] Int. Cl.² .......................................... F16L 35/00
[58] Field of Search ............. 285/18, 145, 322, 323, 285/348, 337, 413, 351

[56] References Cited
UNITED STATES PATENTS

| 1,493,107 | 5/1924 | Cowen | 285/351 |
| 2,438,234 | 3/1948 | Stewart | 285/337 |
| 3,221,838 | 12/1965 | Brayton | 182/178 |
| 3,466,738 | 9/1969 | Mount | 285/18 |
| 3,645,563 | 2/1972 | Rochelle | 285/322 |
| 3,842,612 | 10/1974 | Arnold | 61/72.1 |

*Primary Examiner*—Reinaldo P. Machado

[57] ABSTRACT

A coupling apparatus for making a coupling to a pipe or the like and which apparatus is provided with detachable and removable setting means in the form of hydraulic cylinders which may be reused to subsequently actuate other couplings. The coupling includes a housing which contains gripping and seal means for gripping and sealing with the pipe to which connection is to be made. Thrust means are provided and interposed between the aforesaid actuation means and the sealing and gripping means for urging the latter to the set position. Means in the form of either a split gripping ring or a plurality of gripping slips which are arranged for engaging the internal surface of the housing and retaining the first mentioned gripping means and seal means in the set position when the actuation means are removed.

9 Claims, 6 Drawing Figures

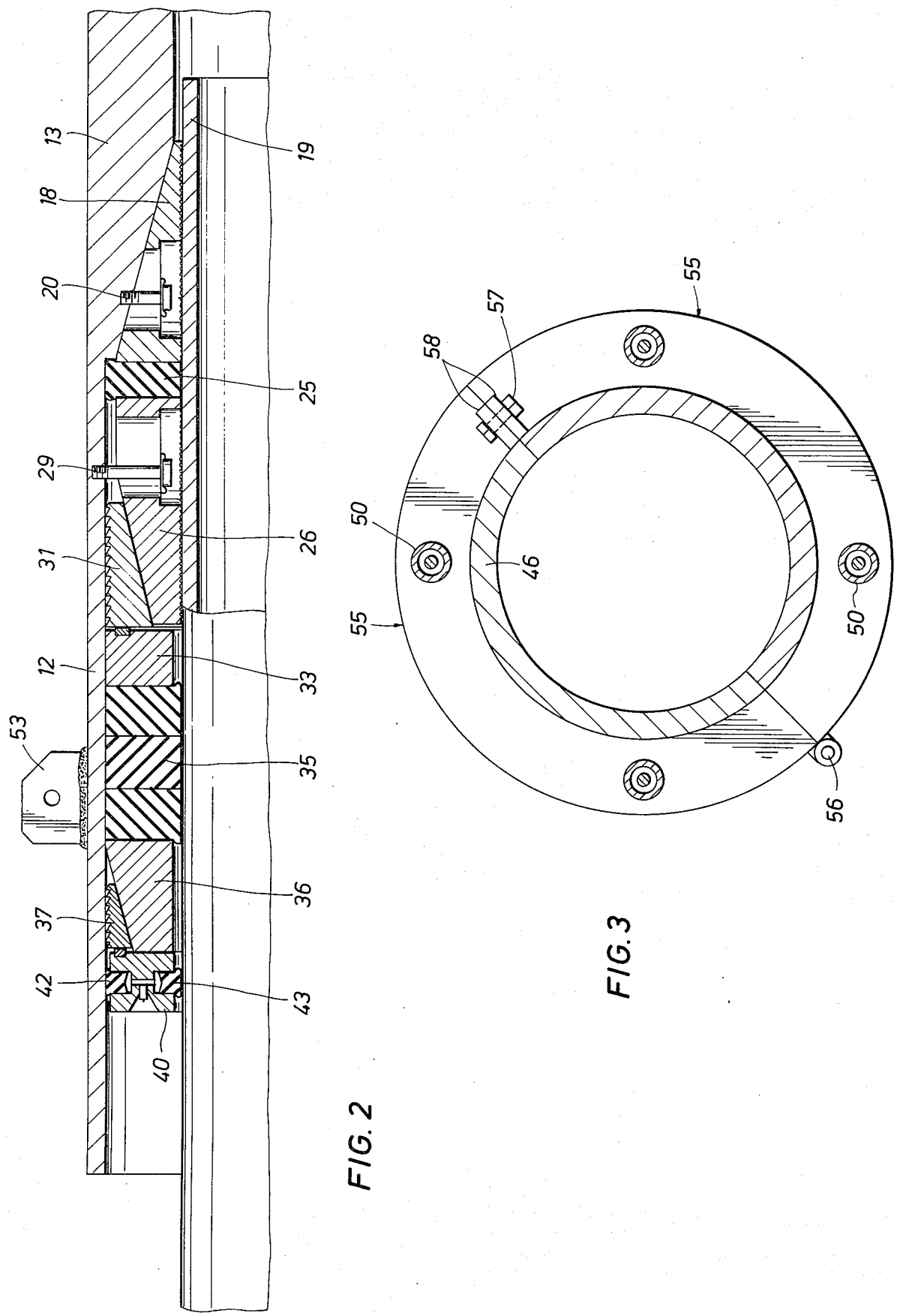

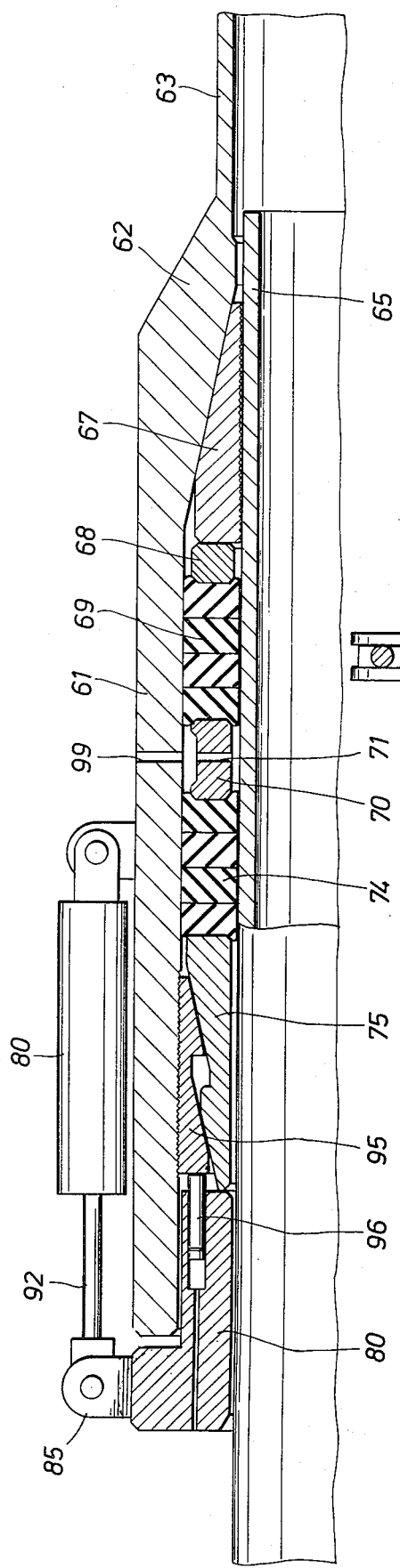
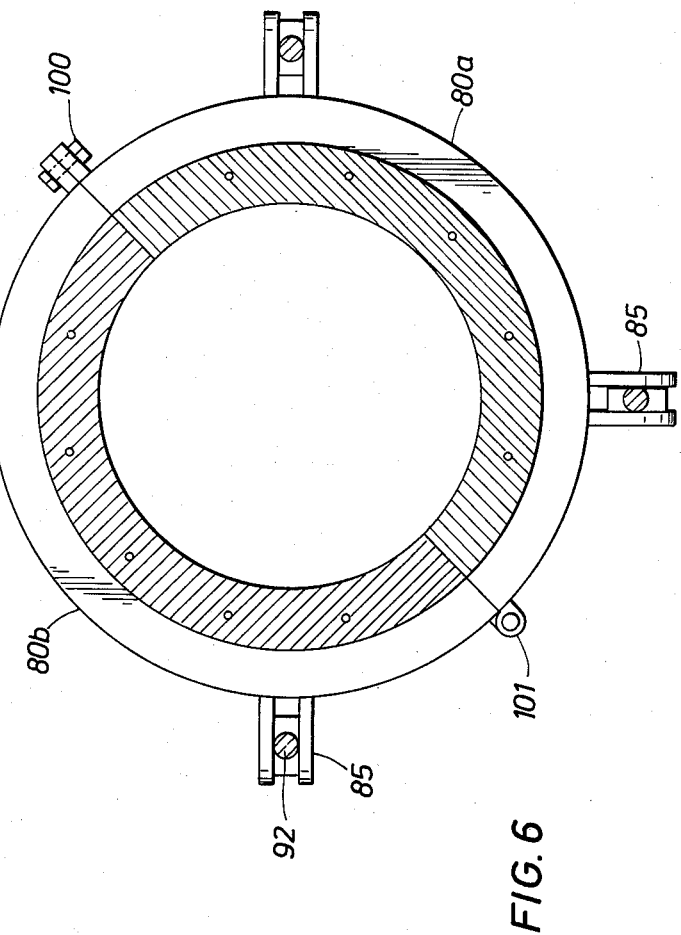
FIG. 5
FIG. 6

PIPE COUPLING WITH RETRIEVABLE SETTING MEANS

BACKGROUND OF THE INVENTION

1. Field of the Invention

This invention relates to coupling apparatuses for making couplings to pipe or the like. More particularly, it relates to a pipe coupling or the like which is arranged for actuation by detachable means such as hydraulic cylinders or the like and with the coupling arranged such that it will stay in the set position upon removal of the actuation means.

2. Description of the Prior Art

There are many examples of prior art pipe couplings which are arranged to be set by hydraulic actuation means. However, hydraulic actuation means are usually in the form of piston and cylinder assemblies which are quite costly to manufacture. In those instances where the piston and cylinder assemblies are permanently incorporated in a pipe coupling, the overall cost of the pipe coupling is naturally increased. On the other hand, if the piston and cylinder assemblies can be removed from the pipe coupling for subsequent reuse and still enable the pipe coupling to remain in set position, then it follows that the cost of the pipe coupling can be reduced.

SUMMARY OF THE INVENTION

It is, therefore, an object of this invention to provide an improved pipe coupling apparatus which has detachable actuation means and which pipe coupling will remain in the actuated or set position upon removal of the actuation means.

Briefly stated, the pipe coupling of this invention includes a housing arranged for mounting about the external surface of a pipe to which the connection is to be made. Gripping means are mounted in the housing for frictionally engaging the external surface of the pipe in response to generally axial force. Deformable annular seal means are mounted in the housing for sealing between the housing and the pipe upon actuation thereof. Annular thrust means having at least a portion thereof extending axially in the housing is arranged for applying axial force to the gripping means and the seal means. The coupling includes detachable means operably connected between the thrust means and the housing for urging the thrust means axially in the housing upon actuation thereof, whereby the thrust means applies axial force to and causes actuation of the gripping means and the seal means. Means are also mounted in the housing for retaining the gripping means and the seal means in the actuated position when the detachable actuation means are detached from the housing, whereby the housing remains sealingly engaged with the pipe.

BRIEF DESCRIPTION OF THE DRAWINGS

FIG. 2 is a fragmentary sectional view similar to that shown in FIG. 1, but showing the apparatus in the set or actuated position and the actuation means removed.

FIG. 3 is a cross-sectional view taken along line 3—3 of FIG. 1.

FIG. 5 is a partial sectional view similar to FIG. 4 but showing the coupling in the set or actuated position.

FIG. 6 is a cross-sectional view generally taken along line 6—6 of FIG. 4.

DESCRIPTION OF THE PREFERRED EMBODIMENT

Figure 1:
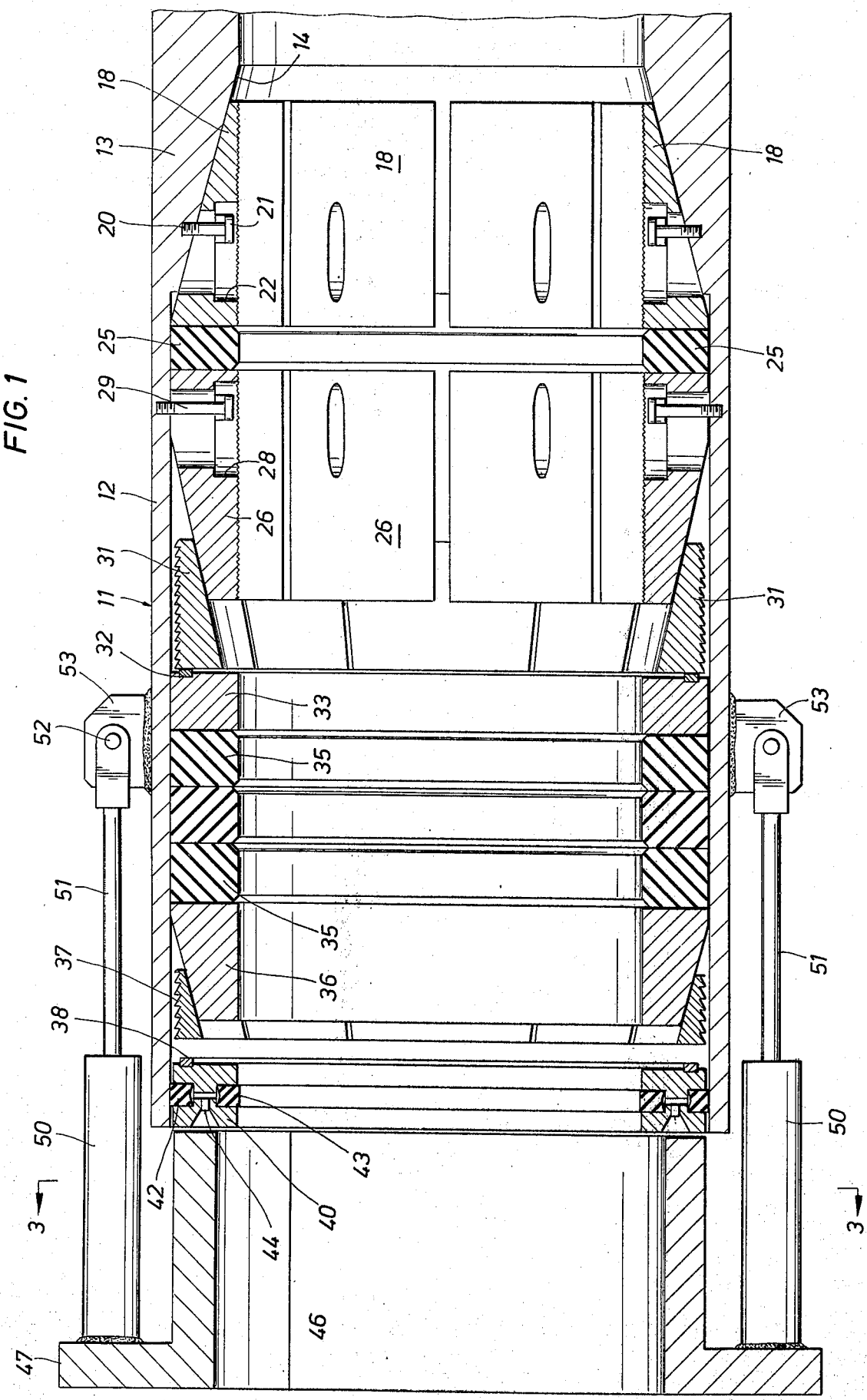
FIG. 1 is a generally central longitudinal sectional view of one embodiment of the coupling of this invention.

Referring now to the first embodiment generally shown in FIG. 1–3, the numeral 11 generally designates the coupling of this embodiment and includes a tubular shell 12 having attached to the right end thereof, as viewed in FIG. 1, a portion indicated as bowl 13, having an axially tapered surface 14 on the internal side thereof. Bowl 13 is arranged for connection to a pipe or conventional flange or the like.

Bowl 13 has mounted radially adjacent to the tapered internal surface 14 a plurality of generally wedge-shaped gripping means in the form of slips 18, each having a tapered outer surface mateable with tapered surface 14 and having gripping teeth on the radially inward side thereof for gripping engagement with the pipe to which connection is to be made, as for example, pipe 19 shown in FIG. 2. Each of the slips 18 is held in the radially retracted or unactuated position and in a circumferentially spaced arrangement, as shown in the drawings, by means of a retainer pin 20 which is threaded into bowl 13 and is provided with a pin head 21 which is arranged for sliding in pin head slot 22 provided longitudinally in each of the slips 18. Hence, upon axial movement of each of the slips 18 to the right, as shown in FIG. 1, the same are cammed radially inwardly by tapered surface 14 of bowl 13 and are retained in the circumferentially spaced position by the aforesaid retainer pins 20.

Slips 18 have abutting against the large ends thereof an elastomeric ring 25 which is arranged for transmitting axial force to slips 18 and which may also be arranged for sealing engagement between pipes 19 and the internal surface of shell 12, as shown in FIG. 2. The other side of ring 25 abuts against the large ends of another plurality of pipe gripping slips 26 which are generally similar to slips 18, but which are positioned such that the outer surfaces thereof are tapered in an opposite axial direction. Each of the slips 26 is provided with a pin head slot 28 in which is mounted a retainer pin 29 which is similar to pin 20 and serves to hold slips 26 in the circumferentially spaced position, both initially and during actuation thereof.

The radially outward surfaces of slips 26 are arranged for sliding and camming engagement with the axially tapered inner surface of split ring bowl 31 having gripping teeth on the radially outward side thereof. Upon axial movement of bowl 31 to the right as shown in FIG. 1, slips 26 are caused to move axially to the right and bowl 31 is urged radially outwardly to engagement with the internal surface of shell 12, as shown in FIG. 2. Bowl 31 is held in the appropriately spaced position by means of retainer pins 32 which extend axially into an annular metal thrust ring 33 which is dimensioned for axial sliding movement inside shell 12 and outside pipe 19.

Thrust ring 33 is arranged for abutment against a plurality of annular elastomeric seals 35 which are arranged for radial deformation into sealing engagement between shell 12 and pipe 19 in response to axial compression. Seals 35 are arranged for axial abutment by annular bowl 36, having a generally cylindrical inner surface and an axially tapered outer surface which is arranged for engagement by an axially tapered split retainer ring 37 having gripping teeth on the radially outward side thereof, which teeth are arranged for engaging the internal surface of shell 12 upon actuation thereof. Ring 37 is arranged for abutment at the axially large end thereof by auxiliary metal thrust ring 38 which is shown imbedded in the axial end of metal end ring 40 which is also arranged for abutment against the end of bowl 36, as shown in FIG. 2.

End ring 40 has a radially outwardly extending annular channel thereabout in which is fitted a radially outwardly movable seal 42 which is arranged for sealing with the internal surface of shell 12 upon actuation thereof. Ring 40 also has a radially inwardly extending annular channel thereabout in which is mounted seal 43 which is arranged upon actuation thereof for engaging the external surface of pipe 19, as shown in FIG. 2. Seals 42 and 43 are arranged for actuation to the sealing position by means of hydraulic pressure applied through appropriately valved ports 44 once the tool has been moved to the set or actuated position. Ring 40, with seals 42 and 43 actuated, seals off the end of shell 12 to prevent incursion of sea water or the like thereinto.

The thrust means of this embodiment includes a generally tubular-shaped thrust member 46 which is arranged for extending axially into the annular space between shell 12 and the external surface of pipe 19. The right axial end of thrust member 46, as shown in FIG. 1, is arranged for engagement with and for transmitting axial force through end ring 40. The other axial end of thrust member 46 has attached thereto a radially outwardly extending flange 47 which has a plurality of hydraulic cylinders 50 attached therewith as by welding or the like which cylinders generally extend longitudinally with shell 12. Each of the hydraulic cylinders 50 has mounted therein a hydraulic piston (not shown) which in turn is connected to a piston rod 51, the other end of which is connected by a removable pin 52 or the like to lug 53. The lugs 53 are circumferentially spaced about and attached as by welding to the external surface of shell 12, as shown. Application of hydraulic fluid to cylinders 50 so as to retract cylinder rods 51 causes thrust member 46 to move to the right with respect to shell 12 and applies axial force to the sealing and gripping means previously described. It is to be understood that thrust member 46 and flange 47 are in the form of two semi-circular portions designated by the numerals 55,55 which are hinged together by hinge 56 and held together by bolt 57 passing through appropriate lugs 58, one of which is attached to each of the portions 55, as shown in FIG. 3. Hence, by removal of bolt 57, thrust member 46 is arranged for removal from about pipe 19 after coupling 11 is attached thereto.

In operation of the embodiment shown in FIGS. 1-3, coupling 11 is initially assembled in the condition shown in FIG. 1. Thereafter, coupling 11 is mounted over the end of pipe 19. Thereafter, hydraulic fluid is applied to cylinders 50 so as to cause thrust member 46 to move axially to the right as shown in FIG. 1, thereby contacting end ring 40 and urging the same to contact with bowl 36 thereby urging it axially to the right. In addition, thrust ring 38 contacts the split ring 37, causing it to be cammed along the external surface of bowl 36 and to be cammed radially outwardly. As bowl 36 is moved to the right, seals 35 are axially and radially deformed into contact with pipe 19. Continued axial movement of thrust member 46 applies axial force to bowl 31 and, hence, to slips 26, elastomeric ring 25 and slips 18. Movement of thrust member 46 is continued until the gripping means in the form of slips 18 and 26 are fully grippingly engaged with pipe 19 as shown in FIG. 2 and elastomeric member 25 axially compressed, as shown. In addition, such axial force causes bowl 31 to engage the internal surface of shell 12 which assists in maintaining slips 26 and 18 in the set position. During the aforesaid axial movement, seals 35 are also sealingly engaged between pipe 19 and shell 12, and the retaining means which includes split ring 37 is firmly engaged with the internal surface of shell 12, as shown in FIG. 2 also. Split ring 37 acts to retain the aforesaid gripping and seal means in the set position. Hydraulic pressure is applied through ports 44 to set seals 42 and 43 to complete the setting of the coupling. Thereafter, thrust member 46 and its attached flange 47 and cylinders 50 can be removed by removing bolt 57 and removing pins 52.

The result is that the aforesaid actuation means may be removed from coupling 11 and thereafter reused. Even though the aforesaid actuation means has been removed, the coupling will stay in the set or actuated position by virtue of the novel arrangement of the retaining means previously described, and including split ring 37. If at some time in the future, it is desirable to reset the coupling or to increase the pressure on the gripping and seal means, the aforesaid thrust member 46, flange 47 and cylinders 50 and associated elements can be reinstalled on coupling 11 and additional axial force applied thereto as previously described. Nevertheless, the hydraulic actuation means is removable and can be maintained in a non-corrosive environment, for example, or can be used for actuating other couplings, if desired.

It is to be understood that split ring 37 may be in the form of a plurality of discrete slips or segmented slips. In either event, the split ring form or the segmented form will generally be referred to as an annular slip assembly, for purposes of this application. Similarly, bowl 31 may be a split ring or may be a plurality of segmented or partially segmented sections.

Figure 4:
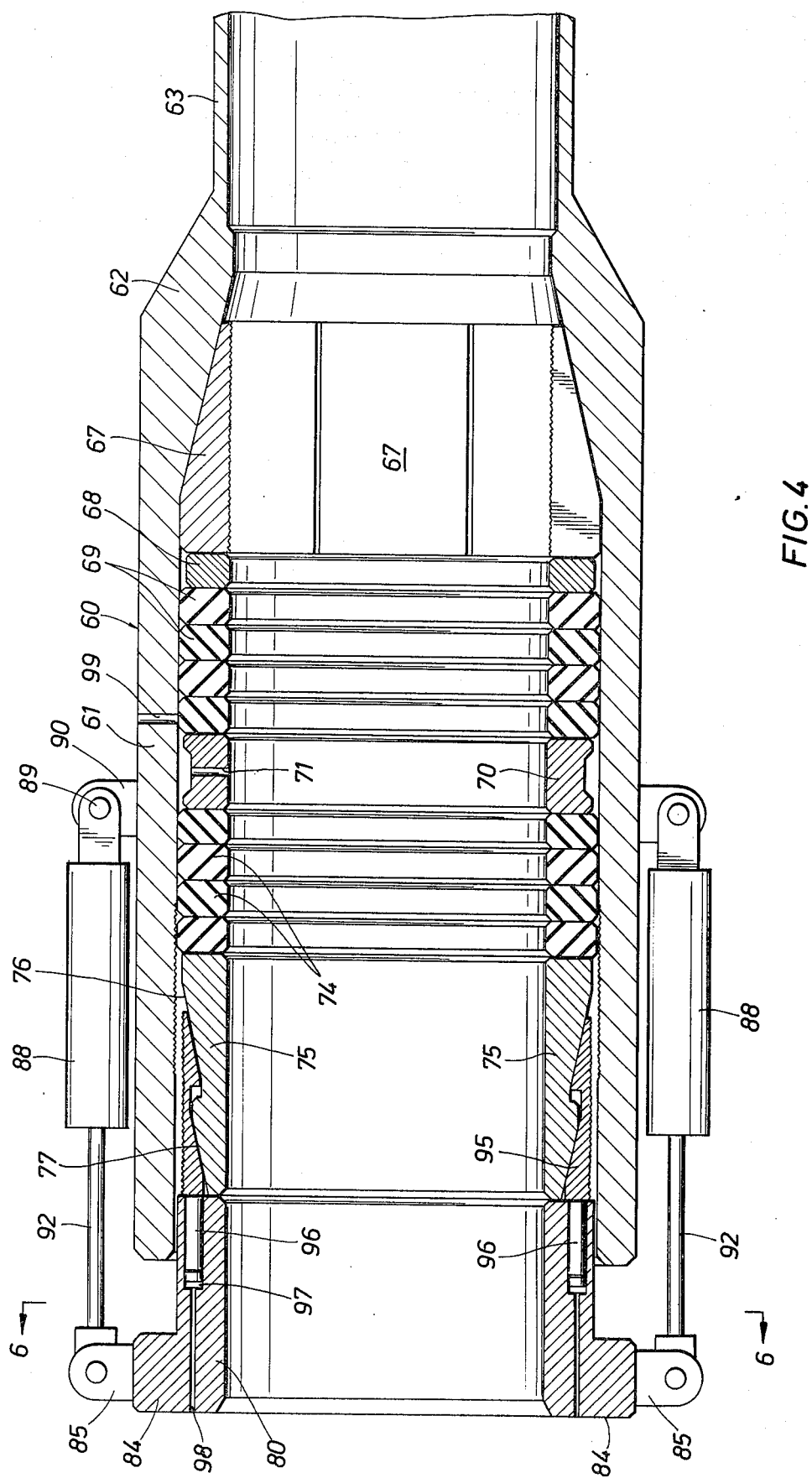
FIG. 4 is a generally longitudinal sectional view of an alternate embodiment of the coupling of this invention.

Referring now to FIG. 4–6, an alternate embodiment of the invention will now be described. There, a coupling is generally designated by the numeral 60, which coupling is comprised of a shell 61 and a bowl 62, which in turn is connected to a pipe sub 63 or the like. Shell 61 is dimensioned for insertion thereinto of a pipe such as pipe 65 shown in FIG. 5.

As with the previous embodiment, this embodiment has pipe gripping means in the form of a plurality of tapered circumferentially spaced about slips 67, having axially tapered radially outer surfaces for camming engagement with bowl 62 and gripping teeth on the radially inward side thereof. The large end of slips 67 are arranged for abutment against metal thrust ring 68, which in turn abuts against a plurality of annular elastomeric seals 69, which in turn abut against an annular test ring 70 having a plurality of radial ports 71 therethrough.

Test ring 70 abuts against another plurality of annular elastomeric seals 74 which in turn are abutted against by an annular bowl 75 having tapered surfaces 76 and 77 on the radially outward side thereof. Bowl 75 is arranged for axial abutment by thrust means in the form of thrust member 80, which is segmented into two halves designated by the numerals 80a and 80b, as shown in FIG. 6. Thrust member 80 has attached to the axial end thereof a radial enlarged portion forming an annular flange 84, which in turn has supported circumferentially thereabout a plurality of lugs 85 arranged to receive therethrough a pin 86.

This embodiment includes actuation means which includes a plurality of longitudinally aligned hydraulic cylinders 88 mounted about the exterior of shell 61 and having one end thereof attached as by pin 89, which passes through a lug 90, which is welded or otherwise attached to shell 61. Each of the cylinders 88 has mounted therein a piston (not shown) which in turn is connected to a piston rod 92, which in turn is connected to one of the lugs 85 by one of the pins 86. Upon retraction of piston rods 92 into cylinders 88, thrust member 80 applies an axial force to bowl 75 which thereby actuates the previously described sealing and gripping means.

The retaining means of this embodiment includes a slip assembly comprised of a plurality of discrete slips 95 mounted radially outwardly of bowl 75, with each of the slips 95 having two axially tapered surfaces on the radially inward side thereof for matching and camming engagement with tapered surfaces 76 and 77 of bowl 75. The slips 95 are also provided with gripping teeth on the radially outward side thereof for engagement with the internal surface of shell 61 upon camming engagement of slips 95 along tapered surfaces 76 and 77.

Each of the slips 95 has attached thereto at the axially outward end thereof an axially extending piston 96, each of which is received in a generally axially extending cylinder 97 formed in the axially inward side of thrust member 80. Thrust member 80 is also provided with a plurality of valved ports 98 through which hydraulic fluid is arranged for application at appropriate times and which application causes actuation of pistons 96 and slips 95 axially to the right relative to bowl 75, thereby causing slips 95 to be cammed radially outwardly into gripping engagement with the internal surface of shell 61, as shown in FIG. 5.

In operation, coupling 60 is assembled in the condition shown in FIG. 4, with the gripping and sealing means in the non-set position and piston rods 92 fully extended in cylinders 88. Coupling 60 is mounted over the exterior of pipe 65 and hydraulic pressure applied to hydraulic cylinders 68 so as to retract piston rods 92 thereinto. As a consequence of this movement, thrust member 80 applies an axial force to bowl 75, seals 74, test ring 70, seals 69, thrust ring 68, thereby camming slips 67 radially inwardly along the tapered surface of bowl 62 to engagement with pipe 65 as shown in FIG. 5. Continued application of such axial force ultimately causes seals 69 and 74 to be axially compressed and moved to the sealing position shown in FIG. 5. By this axial movement, test ring 70 is moved such that it is radially adjacent an appropriately valved hydraulic port 99 through which hydraulic pressure can be applied which passes through ports 71 to test the sealing of seals 68 and 74. Any loss of pressure once the area surrounding test ring 70 is pressured up would indicate improper sealing. If improper sealing is detected, then thrust member 80 can be retracted and the failure investigated. In the event, however, that sealing is completed, then hydraulic pressure can be applied through appropriately valved ports 98 to actuate slips 95 to the retaining position previously described, as shown in FIG. 5.

With slips 95 then fully engaged and retaining the tool in the set condition, thrust member 80 may be removed by operation of piston rods 92 to move the same to the left, as shown in FIGS. 4 and 5. Thereafter, sections 80a and 80b of thrust member 80 can be removed by disengaging bolt 100 and pivoting sections 80a and 80b open around hinge 101 and removing pins 86 and 89 from the aforesaid cylinder assemblies. Hence, these actuation means may be removed for subsequent use or may subsequently be reinstalled in case it is desired to apply additional axial force to the gripping and seal means at a later date.

It will thus be observed that this invention provides a coupling which has detachable actuation means and is arranged such that the coupling will remain in the set condition even after the actuation means are removed by virtue of the arrangement of the tool. As a result, there is provided a much more economical tool than was possible with the prior art tools and one wherein the actuation means may be conveniently protected from a corrosive environment during periods of nonusage.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a pipe coupling apparatus, the combination comprising:

a housing arranged for mounting about the external surface of a pipe to which connection is to be made;

gripping means mounted in said housing for frictionally engaging the external surface of said pipe in response to a generally axial force;

deformable annular seal means mounted in said housing for sealing between said housing and said pipe upon actuation thereof;

annular thrust means for applying said axial force to said gripping means and said seal means upon actuation thereof;

detachable actuation means operably connected between said thrust means and said housing for urging said thrust means axially in said housing upon actuation thereof, whereby said thrust means applies axial force to and causes actuation of said gripping means and said seal means;

and means actuable by said actuation means and engagable with said housing for retaining said gripping means and said seal means in said actuated position independently of said actuation means when the latter are detached from said housing, whereby said housing remains sealingly engaged with said pipe.

2. The invention as claimed in claim 1 wherein:
said retaining means includes an annular slip assembly arranged for gripping the internal surface of said housing.

3. The invention as claimed in claim 2 wherein:
said retaining means includes an axially tapered bowl, and said slip assembly has a tapered inner surface for camming engagement by the tapered surface of said bowl.

4. The invention as claimed in claim 2 wherein:
said slip assembly is in the form of a split ring.

5. The invention as claimed in claim 2 wherein:
said slip assembly is in the form of a plurality of slips circumferentially spaced about in said housing.

6. The invention as claimed in claim 2 wherein: said slip assembly is arranged for actuation by said thrust means.

7. The invention as claimed in claim 2 including:
means for actuating said slip assembly to the set position after said first actuation means has actuated said gripping means and said seal means.

8. The invention as claimed in claim 1 wherein:
said detachable actuation means includes a plurality of hydraulic piston and cylinder assemblies, each of which is operatively connected between said thrust means and said housing for urging said thrust means axially relative to said housing to thereby apply axial force to said thrust means.

9. The invention as claimed in claim 1 wherein:
said thrust means includes a plurality of separable arcuate segments arranged for removal from about said pipe after actuation thereof.

* * * * *